(12) United States Patent
Horikoshi et al.

(10) Patent No.: US 11,799,547 B2
(45) Date of Patent: Oct. 24, 2023

(54) SIGNAL PROCESSING APPARATUS, SIGNAL PROCESSING METHOD, AND PROGRAM

(71) Applicant: NIPPON TELEGRAPH AND TELEPHONE CORPORATION, Tokyo (JP)

(72) Inventors: Kengo Horikoshi, Musashino (JP); Masanori Nakamura, Musashino (JP); Seiji Okamoto, Musashino (JP); Hideki Nishizawa, Musashino (JP); Etsushi Yamazaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/635,275

(22) PCT Filed: Sep. 17, 2019

(86) PCT No.: PCT/JP2019/036277
§ 371 (c)(1),
(2) Date: Feb. 14, 2022

(87) PCT Pub. No.: WO2021/053706
PCT Pub. Date: Mar. 25, 2021

(65) Prior Publication Data
US 2022/0303003 A1  Sep. 22, 2022

(51) Int. Cl.
*H04B 10/079* (2013.01)
*H04B 10/2569* (2013.01)
*H04B 10/61* (2013.01)

(52) U.S. Cl.
CPC ... *H04B 10/07951* (2013.01); *H04B 10/2569* (2013.01); *H04B 10/6162* (2013.01)

(58) Field of Classification Search
CPC .......... H04B 10/07951; H04B 10/2569; H04B 10/6162
(Continued)

(56) References Cited

U.S. PATENT DOCUMENTS

2008/0260141 A1* 10/2008 Givens ................. H04M 9/082
379/406.08
2010/0054759 A1* 3/2010 Oda ................. H04L 25/03038
398/202
(Continued)

FOREIGN PATENT DOCUMENTS

JP   2010057016 A   3/2010

OTHER PUBLICATIONS

Gu et al; L0 norm constraint LMS algorithm for sparse System Identification; Jun. 2009; IEEE signal processing; pp. 1-10. (Year: 2009).*

(Continued)

*Primary Examiner* — Amritbir K Sandhu
(74) *Attorney, Agent, or Firm* — Harness, Dickey & Pierce, P.L.C.

(57) ABSTRACT

A signal processing apparatus includes: a coefficient update unit configured to approximate a characteristic of a transmission line of an optical signal by a first tap coefficient vector of which an L0 norm is a predetermined value or less; a zeroing unit configured to generate a second tap coefficient vector by replacing, with 0, a tap coefficient of which an absolute value is less than a threshold among tap coefficients of the first tap coefficient vector; and an adaptive filter configured to perform, based on the second tap coefficient vector, adaptive equalization processing on a digital signal corresponding to an optical signal received via the transmission line.

4 Claims, 8 Drawing Sheets

(58) Field of Classification Search
USPC .......................................................... 398/29
See application file for complete search history.

(56) References Cited

U.S. PATENT DOCUMENTS

| | | | |
|---|---|---|---|
| 2015/0263701 A1* | 9/2015 | Saeed ................ | H03H 21/0043 |
| | | | 708/322 |
| 2020/0119814 A1* | 4/2020 | Binkai ................ | H04B 10/615 |
| 2022/0303003 A1* | 9/2022 | Horikoshi ........ | H04B 10/07951 |

OTHER PUBLICATIONS

Gu et al; L0 norm constraint LMS algorithm for sparse System Identification; Jun. 2009; IEEE Signal Processing letters; pp. 1-10. (Year: 2009).*

Huang et al; A Norm Constraint Lorentzian Algorithm Under Alpha-stable Measurement Noise; Nov. 2019; APSIPA Annual Summit and Conference ; pp. 1-4. (Year: 2019).*

Yuantao Gu, Jian Jin, and Shunliang Mei, "$l_0$ Norm Constraint LMS Algorithm for Sparse System Identification", IEEE Signal Processing Letters, 16(9):774-777, 2009.

* cited by examiner

SIGNAL PROCESSING APPARATUS, SIGNAL PROCESSING METHOD, AND PROGRAM

CROSS-REFERENCE TO RELATED APPLICATIONS

This application is a 371 U.S. National Phase of International Application No. PCT/JP2019/036277 filed on Sep. 17, 2019. The entire disclosure of the above application is incorporated herein by reference.

TECHNICAL FIELD

The present invention relates to a signal processing apparatus, a signal processing method, and a program.

BACKGROUND ART

The state of polarization and polarization mode dispersion in an optical signal transmitted through an optical fiber (transmission line) varies depending on conditions such as temperature and vibration of the optical fiber. Thus, in digital coherent optical transmission, an adaptive equalizer provided in a signal processing apparatus on a reception side performs polarization separation and polarization mode dispersion (PMD) compensation on the optical signal transmitted through the optical fiber.

The L0 norm-constrained least mean squared (LMS) algorithm has been proposed as an algorithm suitable for estimating sparse characteristic (see Non Patent Document 1).

CITATION LIST

Non Patent Document

Non Patent Document 1: Yuantao Gu, Jian Jin, and Shunliang Mei, "$l_0$ Norm Constraint LMS Algorithm for Sparse System Identification", IEEE Signal Processing Letters, 16 (9): 774-777, 2009

SUMMARY OF THE INVENTION

Technical Problem

From the perspective of reducing the size and integration of a signal processing apparatus, there is a demand for a reduction in power consumption of a Digital Signal Processor (DSP), which is an essential element for digital coherent optical transmission. In the DSP, approximately 20% of the overall DSP's power consumption may account for power consumption of an adaptive equalizer. Here, the smaller the number of taps of an adaptive filter included in the adaptive equalizer, the lower power consumption of the adaptive equalizer.

However, when the number of taps of the adaptive filter provided in the adaptive equalizer is small, the performance of the signal processing apparatus to compensate for polarization mode dispersion is reduced. In this manner, when power consumption of the adaptive equalization processing is reduced, there is a problem that the signal processing apparatus cannot maintain the performance of compensating for polarization mode dispersion.

In light of the above-mentioned situation, an object of the present invention is to provide a signal processing apparatus, a signal processing method, and a program that are capable of maintaining the performance of compensating for polarization mode dispersion generated in the optical signal even when power consumption of the adaptive equalization processing is reduced.

Means for Solving the Problem

An aspect of the present invention is a signal processing apparatus including: a coefficient update unit configured to approximate a characteristic of a transmission line of an optical signal by a first tap coefficient vector of which an L0 norm is a predetermined value or less; a zeroing unit configured to generate a second tap coefficient vector by replacing, with 0, a tap coefficient of which an absolute value is less than a threshold among tap coefficients of the first tap coefficient vector; and an adaptive filter configured to perform, based on the second tap coefficient vector, adaptive equalization processing on a digital signal corresponding to an optical signal received via the transmission line.

Effects of the Invention

According to the present invention, it is possible to maintain the performance of compensating for polarization mode dispersion generated in the optical signal even when power consumption of the adaptive equalization processing is reduced.

DESCRIPTION OF EMBODIMENTS

An embodiment of the present invention will be described in detail with reference to the drawings.

Figure 1:
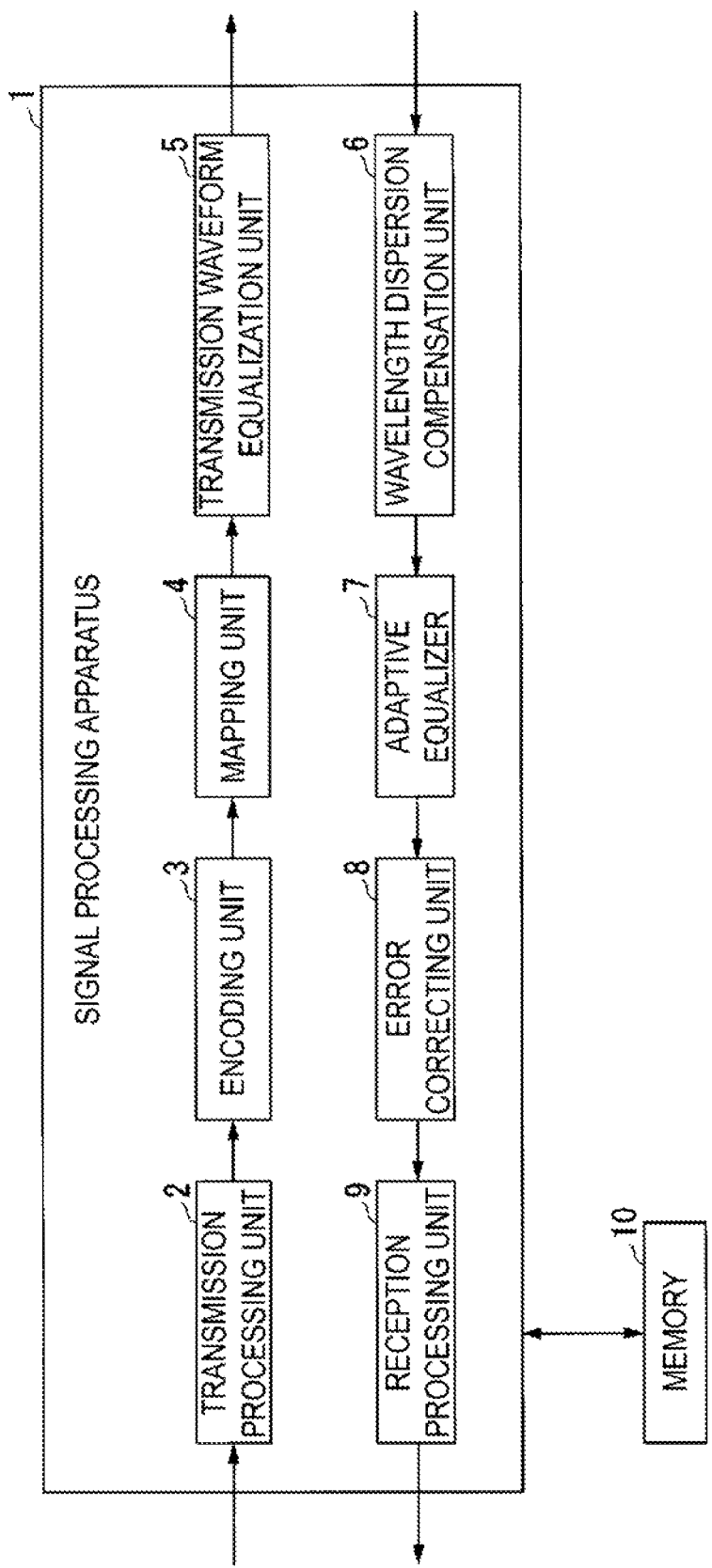
FIG. 1 is a diagram illustrating a configuration example of a signal processing apparatus according to an embodiment of the present invention.

FIG. 1 is a diagram illustrating a configuration example of a signal processing apparatus 1. The signal processing apparatus 1 performs signal processing in digital coherent optical transmission. The signal processing apparatus 1 performs adaptive equalization processing with reduced power consumption by using, for example, an LMS algorithm with L0 norm constraints on the tap coefficient vector of the adaptive filter. The signal processing apparatus 1 maintains the performance of compensating for polarization mode dispersion generated in an optical signal even when power consumption of the adaptive equalization processing is reduced.

The signal processing apparatus 1 includes a transmission processing unit 2, an encoding unit 3, a mapping unit 4, a transmission waveform equalization unit 5, a wavelength dispersion compensation unit 6, an adaptive equalizer 7 (AEQ), an error correcting unit 8, and a reception processing unit 9.

A part or all of the signal processing apparatus 1 is realized as software by causing a processor such as a DSP, a central processing unit (CPU), or the like to execute a program expanded in a memory 10 from a storage device which is a nonvolatile recording medium (non-transitory recording medium). The program may be recorded on a computer-readable recording medium. The computer-readable recording medium is, for example, a non-transitory recording medium such as a portable medium such as a flexible disk, an optical magnetic disk, a read only memory (ROM), or a compact disc read only memory (CD-ROM), and the storage device of a hard disk built into a computer system. The program may be transmitted via an electrical communication line.

A part or all of the signal processing apparatus 1 may be implemented by using, for example, hardware including an electronic circuit (or circuitry) in which a large scale integration circuit (LSI), an application specific integrated circuit (ASIC), a programmable logic device (PLD), a field programmable gate array (FPGA), or the like.

The transmission processing unit 2, the encoding unit 3, the mapping unit 4, and the transmission waveform equalization unit 5 perform processing on the transmission side in the digital coherent optical transmission. The transmission processing unit 2 generates a bit sequence to be transmitted. The encoding unit 3 performs forward error correction (FEC) encoding processing on the bit string to be transmitted. The encoding unit 3 outputs the resulting transmitted signal to the mapping unit 4. The mapping unit 4 maps the transmitted signal output from the encoding unit 3 to a symbol. The transmission waveform equalization unit 5 compensates for waveform distortion of the transmitted signal mapped to the symbol. The transmission waveform equalization unit 5 transmits the optical signal with compensated waveform distortion to a predetermined communication apparatus via an optical fiber. The predetermined communication apparatus may include the signal processing apparatus 1.

The wavelength dispersion compensation unit 6, the adaptive equalizer 7, the error correcting unit 8, and the reception processing unit 9 perform processing on the reception side in the digital coherent optical transmission. The wavelength dispersion compensation unit 6 acquires the optical signal transmitted through the transmission line, and generates a digital signal corresponding to the acquired optical signal. In other words, the wavelength dispersion compensation unit 6 acquires digital signals "xi" and "xq" corresponding to X polarization of the received optical signal and digital signals "yi" and "yq" corresponding to Y polarization of the received optical signal.

The wavelength dispersion compensation unit 6 performs processing of compensating for the wavelength dispersion generated in the waveform of an optical signal in an optical fiber (transmission line) on a digital signal corresponding to the received optical signal. The wavelength dispersion compensation unit 6 outputs the digital signal corresponding to the X polarization of the optical signal, which is subjected to wavelength dispersion compensation, and the digital signal corresponding to the Y polarization of the optical signal, which is subjected to wavelength dispersion compensation, to the adaptive equalizer 7.

Hereinafter, a symbol indicated above a character in an equation is written immediately before the character. For example, a symbol "^" attached above a character "x" in an equation is described immediately before the character "x" like "^x".

The adaptive equalizer 7 performs adaptive equalization processing on the digital signal corresponding to the X polarization and the digital signal corresponding to the Y polarization on the basis of tap coefficient vectors set for the plurality of taps of the adaptive filter. The adaptive equalizer 7 outputs, to the error correcting unit 8, a digital signal "^$x_a$" corresponding to the X polarization, which is subjected to the adaptive equalization processing, and a digital signal "^$y_a$" corresponding to the Y polarization, which is subjected to the adaptive equalization processing.

The error correcting unit 8 acquires, from the adaptive equalizer 7, the digital signal "^$x_a$" corresponding to the X polarization, which is subjected to the adaptive equalization processing, and the digital signal "^$y_a$" corresponding to the Y polarization, which is subjected to the adaptive equalization processing. The error correcting unit 8 corrects a code error generated in an optical signal caused by inter-code interference (inter-symbol interference) in an optical fiber, in the digital signal subjected to the adaptive equalization processing. The error correcting unit 8 outputs the digital signal whose code error has been corrected to the reception processing unit 9. The reception processing unit 9 performs predetermined reception processing on the digital signal whose code error has been corrected.

Details of the adaptive equalizer 7 will now be described.

Figure 2:
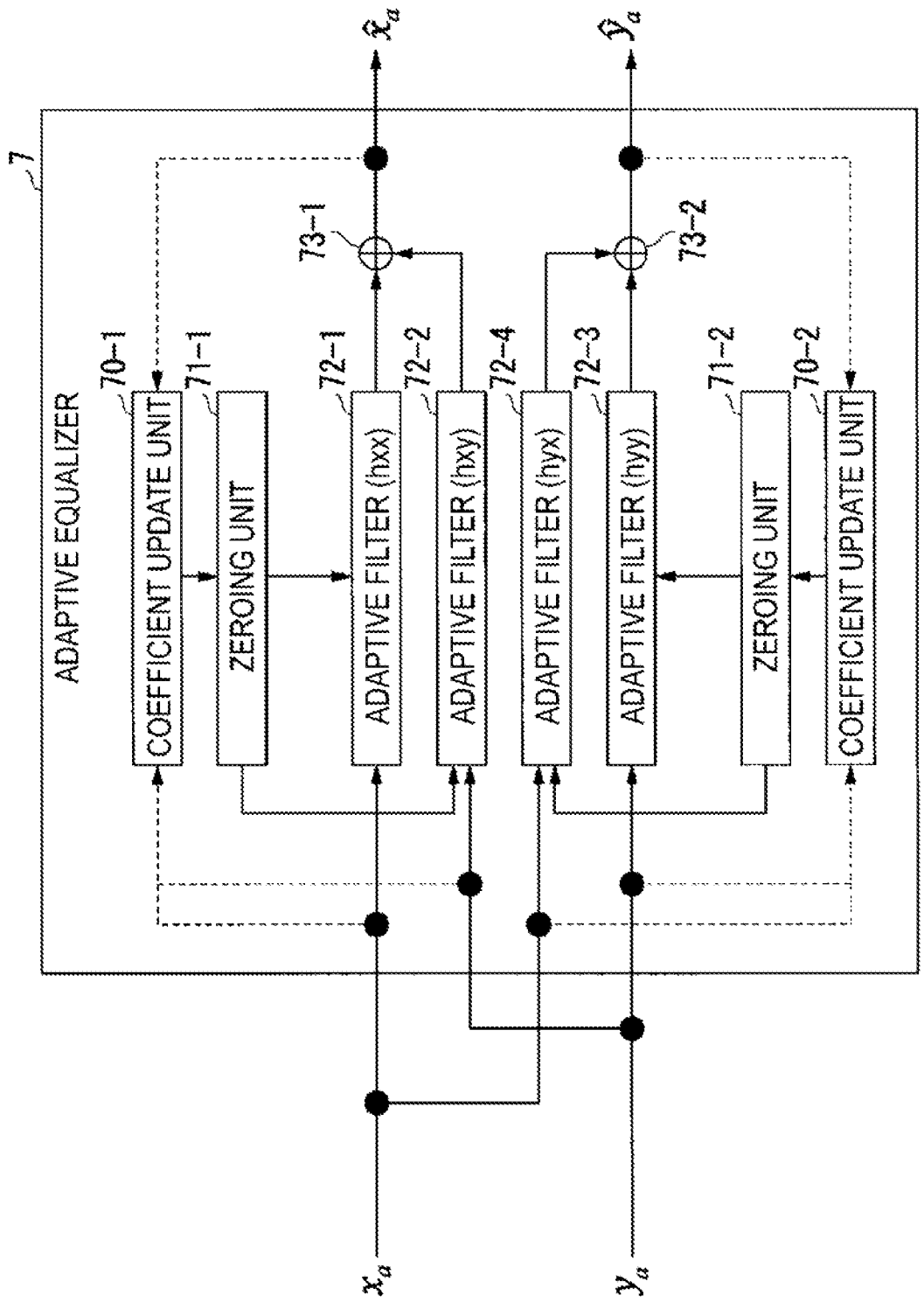
FIG. 2 is a diagram illustrating a configuration example of an adaptive equalizer according to the embodiment.

FIG. 2 is a diagram illustrating a configuration example of the adaptive equalizer 7. Generally, the adaptive equalizer includes four complex filters, or eight real filters. In FIG. 2, the adaptive equalizer 7 comprises coefficient update units (coefficient updaters) 70-1 to 70-2, zeroing units (generator) 71-1 to 71-2, adaptive filters 72-1 to 72-4 (four complex filters), and addition units 73-1 to 73-2. The coefficient update unit 70-1 may include the zeroing unit 71-1. The coefficient update unit 70-2 may include the zeroing unit 71-2.

Using the adaptive filters 72-1 to 72-4, the adaptive equalizer 7 restores signal components distributed with frequency characteristics to lanes of digital signals "xi", "xq", "yi" and "yq" due to polarization rotation and polarization mode dispersion.

Hereinafter, items common to the coefficient update units 70-1 to 70-2 will be referred to as "coefficient update unit 70" by omitting a part of the reference signs. Hereinafter, items common to the zeroing units 71-1 to 71-2 will be referred to as "zeroing unit 71" by omitting a part of the reference signs. Hereinafter, items common to the adaptive filters 72-1 to 72-4 will be referred to as "adaptive filter 72" by omitting a part of the reference signs. Hereinafter, items common to the addition units 73-1 to 73-2 will be referred to as "addition unit 73" by omitting a part of the reference signs.

The coefficient update unit 70 derives a sparse model that approximates the characteristic of a transmission line of an optical signal. In other words, the coefficient update unit 70 derives a sparse tap coefficient vector that approximates the characteristic of the transmission line of the optical signal. The characteristic of the transmission line may be a non-sparse characteristic. The non-sparse characteristic is, for example, the characteristic of polarization mode dispersion of the optical signal.

The coefficient update unit 70-1 acquires, from the wavelength dispersion compensation unit 6, the digital signal corresponding to the X polarization of the optical signal which is subjected to wavelength dispersion compensation, and the digital signal corresponding to the Y polarization of the optical signal which is subjected to wavelength dispersion compensation. The coefficient update unit 70-1 acquires, from the addition unit 73-1, the digital signal "^$x_a$" corresponding to the X polarization, which is subjected to the adaptive equalization processing.

The coefficient update unit 70-1 derives a sparse tap coefficient vector as the tap coefficient for each tap included in the adaptive filter 72-1. The same applies to the adaptive filter 72-2. The coefficient update unit 70-1 outputs the derived tap coefficient vector to the zeroing unit 71-1.

The coefficient update unit 70-2 acquires, from the wavelength dispersion compensation unit 6, the digital signal corresponding to the X polarization of the optical signal which is subjected to wavelength dispersion compensation, and the digital signal corresponding to the Y polarization of the optical signal which is subjected to wavelength dispersion compensation. The coefficient update unit 70-2 acquires, from the addition unit 73-2, the digital signal "^$y_a$" corresponding to the Y polarization which is subjected to the adaptive equalization processing.

The coefficient update unit 70-2 derives a sparse tap coefficient vector as the tap coefficient for each tap included in the adaptive filter 72-3. The same applies to the adaptive filter 72-4. The coefficient update unit 70-2 outputs the derived tap coefficient vector to the zeroing unit 71-2.

The zeroing unit 71 determines, for each element of the tap coefficient vector, whether or not an absolute value of the element (tap coefficient) of the tap coefficient vector is a threshold or more.

When the tap coefficient vector does not include the tap coefficient whose absolute value is less than the threshold, the zeroing unit 71-1 outputs the tap coefficient vector derived by the coefficient update unit 70-1 to the adaptive filter 72-1. When the tap coefficient vector includes the tap coefficient whose absolute value is less than the threshold, the zeroing unit 71-1 updates the value of the tap coefficient whose absolute value is less than the threshold to 0 in the tap coefficient vector, and sets the updated tap coefficient vector to the adaptive filter 72-1. The same applies to the adaptive filter 72-2.

When the tap coefficient vector does not include the tap coefficient whose absolute value is less than the threshold, the zeroing unit 71-2 outputs the tap coefficient vector derived by the coefficient update unit 70-2 to the adaptive filter 72-3. When the tap coefficient vector includes the tap coefficient whose absolute value is less than the threshold, the zeroing unit 71-2 updates the value of the tap coefficient whose absolute value is less than the threshold to 0 in the tap coefficient vector, and sets the updated tap coefficient vector to the adaptive filter 72-3. The same applies to the adaptive filter 72-4.

The adaptive filter 72 is configured using a Finite Impulse Response (FIR) filter. A tap coefficient is set to each tap of the adaptive filter 72 on the basis of the tap coefficient vector output from the zeroing unit 71.

The adaptive filter 72-1 performs the adaptive equalization processing on the digital signal "$x_a$" corresponding to the X polarization. The adaptive filter 72-1 outputs a result of the adaptive equalization processing for the digital signal "$x_a$" corresponding to the X polarization to the addition unit 73-1. The adaptive filter 72-2 performs the adaptive equalization processing on the digital signal "$y_a$" corresponding to the Y polarization. The adaptive filter 72-2 outputs a result of the adaptive equalization processing for the digital signal "$y_a$" corresponding to the Y polarization to the addition unit 73-1.

The adaptive filter 72-3 performs the adaptive equalization processing on the digital signal "$y_a$" corresponding to the Y polarization. The adaptive filter 72-3 outputs a result of the adaptive equalization processing for the digital signal "$y_a$" corresponding to the Y polarization to the addition unit 73-2. The adaptive filter 72-4 performs the adaptive equalization processing on the digital signal "$x_a$" corresponding to the X polarization. The adaptive filter 72-4 outputs a result of the adaptive equalization processing for the digital signal "$x_a$" corresponding to the X polarization to the addition unit 73-2.

The addition unit 73-1 outputs, to the error correcting unit 8, an addition result of the result of the adaptive equalization processing for the digital signal "$x_a$" in the adaptive filter 72-1 and the result of the adaptive equalization processing for the digital signal "$y_a$" in the adaptive filter 72-2, as an estimated result "^$x_a$" of the digital signal corresponding to the X polarization.

The addition unit 73-2 outputs, to the error correcting unit 8, an addition result of the result of the adaptive equalization processing for the digital signal "$y_a$" in the adaptive filter 72-3 and the result of the adaptive equalization processing for the digital signal "$x_a$" in the adaptive filter 72-4, as an estimated result "^$y_a$" of the digital signal corresponding to the Y polarization.

Figure 3:
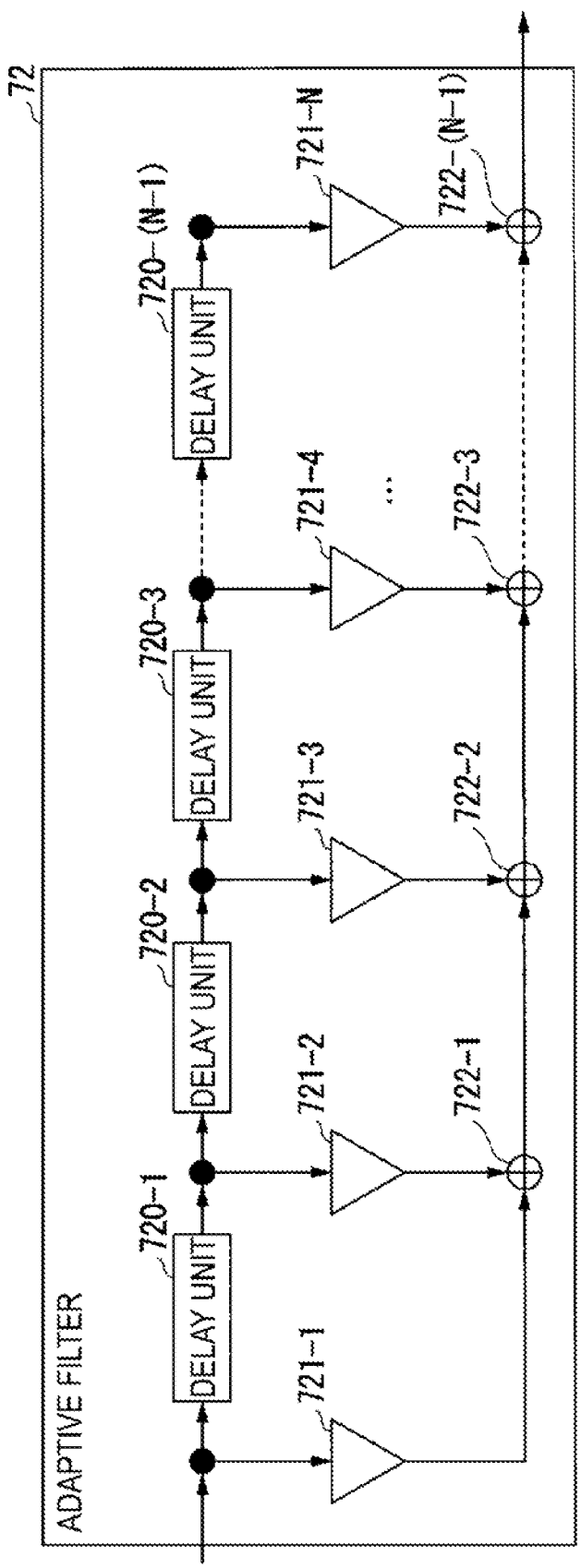
FIG. 3 is a diagram illustrating a configuration example of an adaptive filter according to the embodiment.

FIG. 3 is a diagram illustrating a configuration example of the adaptive filter 72. The adaptive filter 72 includes delay units 720-1 to 720-(N−1), multiplication units 721-1 to 721-N, and addition units 722-1 to 722-(N−1). Here, "N" is an integer of 2 or more.

The delay unit 720 delays the signal input to the adaptive filter 72. The multiplication unit 721 complex-multiplies the output of the delay unit 720 by the tap coefficient. The addition unit 722 complex-adds the output of the multiplication unit 721 and the output of the addition unit 722 in the previous stage.

The longer the length of the FIR filter (the number of taps actually used) is longer, the higher power consumption of the adaptive filter 72. In order to improve the performance of compensating for polarization mode dispersion, the length of the FIR filter needs to be increased. There is a need for an FIR filter that is longer than a maximum delay between polarizations caused by polarization mode dispersion (DGD: differential group delay). That is, the length of the FIR filter needs to satisfy Equation (1).

[Math. 1]
$$L_{tap} > \frac{\tau_{DGD}}{\Delta T} \quad (1)$$

Here, "$L_{tap}$" represents the length of the FIR filter (the number of taps). "$\Delta T$" represents a sampling period. "$\tau_{DGD}$" represents the maximum delay between polarizations. When the adaptive equalizer 7 includes four adaptive filters 72 (complex FIR filters), complex multiplication of "$4 \times L_{tap}$" times and complex addition of "$4 \times (L_{tap}-1)$" times are required.

Summary of Adaptive Equalization Processing

The coefficient update unit 70 approximates the characteristic of the transmission line of the optical signal by the sparse tap coefficient vector. Whether the tap coefficient vector is sparse (whether the L0 norm satisfies a constraint) is determined, for example, based on whether the L0 norm of the tap coefficient vector (the number of elements other than 0) is a predetermined value or less.

The coefficient update unit 70 uses an optimization algorithm (an algorithm of the most steep drop method) having the constraint that the L0 norm of the tap coefficient vector is the predetermined value or less (algorithm of the steepest descent method) to approximate the characteristic of the transmission line of the optical signal by a sparse tap coefficient vector. Examples of the algorithm of the steepest descent method (optimization algorithm) includes: an L0 norm-constrained LMS algorithm; an L0 norm-constrained Recursive Least Square (RLS) algorithm; and an L0 norm-constrained Constant Modulus Algorithm (CMA) algorithm.

The coefficient update unit 70 generates a first tap coefficient vector. The first tap coefficient vector is a tap coefficient vector for performing a recursive optimization process.

The zeroing unit 71 generates a second tap coefficient vector based on the first tap coefficient vector. When the first tap coefficient vector does not include an element (tap coefficient) whose absolute value is less than a threshold, the zeroing unit 71 defines the first tap coefficient vector as the second tap coefficient vector.

When the first tap coefficient vector does not include an element (tap coefficient) whose absolute value is less than the threshold, the zeroing unit 71 replaces the element whose absolute value is less than the threshold with 0. The zeroing unit 71 defines the first tap coefficient vector in which the element whose absolute value is less than the threshold is replaced with 0, as the second tap coefficient vector. That is, the zeroing unit 71 defines the result of changing an element having an absolute value less than the threshold in the first tap coefficient vector to 0, as the second tap coefficient vector.

The zeroing unit 71 sets the second tap coefficient vector to the adaptive filter 72. The second tap coefficient vector is used to equalize the main signal in the adaptive filter 72.

The coefficient update unit 70 or the zeroing unit 71 derives the L0 norm of the tap coefficient vector (the number of elements other than 0). The coefficient update unit 70 or the zeroing unit 71 adjusts parameters such as a cost function such that the L0 norm of the tap coefficient vector is the predetermined value or less.

Sparse FIR Filter

As the length "$L_{tap}$" of the FIR filter is shorter, power consumption of the adaptive equalization processing is reduced. In the digital coherent optical transmission, the signal processing apparatus may use an adaptive filter having a small number of taps to reduce power consumption. In addition, the signal processing apparatus may reduce power consumption by multiplying some taps by a tap coefficient other than 0, and fixing the tap coefficients of the remaining taps to 0 in an adaptive filter having a large number of taps. However, when power consumption of the adaptive equalization processing is reduced, the signal processing apparatus cannot maintain the performance of compensating for polarization mode dispersion.

Thus, the signal processing apparatus 1 sets the tap coefficients of a large number of taps to be 0 in the adaptive filter 72 so as to approximate characteristic of the transmission line of the optical signal. This reduces the number of computations (multiplication and addition) that consume power in the adaptive filter 72. That is, in the computation using 0, practically nothing is performed, and no power is consumed.

For example, the characteristics of multi-paths in acoustic systems and wireless communication transmission lines are sparse characteristics. When compensating for the sparse characteristic, the signal processing apparatus 1 includes the sparse adaptive filter 72. In the sparse adaptive filter 72, even when the FIR filter has a long length "$L_{tap}$", a small number of taps perform multiplication using other than 0 and, thus the amount of computation is small.

Algorithm

When the characteristic related to the transmission line is known, the signal processing apparatus 1 defines an impulse response corresponding to the inverse characteristic of the characteristic of the transmission line as the tap coefficient vector of the FIR filter.

When the characteristic related to the transmission line is unknown, the signal processing apparatus 1 uses an LMS algorithm, an RLS algorithm, a constant envelope algorithm, or the like to estimate the characteristic of the transmission line. The signal processing apparatus 1 optimizes the tap coefficient vector so as to minimize the error between the value of the output signal of the FIR filter and a target value.

The LMS algorithm with L0 norm constraint of the tap coefficient vector is a suitable algorithm for estimating sparse characteristics. In the typical LMS algorithm, it is targeted to minimize squared error.

In contrast, in the LMS algorithm with L0 norm constraint of the tap coefficient vector, it is targeted to optimize both the squared error "$|e(n)|^2$" and the number of taps using tap coefficients other than 0 "$\|w(n)\|_0$". Although the characteristic of polarization mode dispersion is not a sparse characteristic, the signal processing apparatus 1 uses the L0 norm-constrained LMS algorithm or the like to optimize both the squared error in the cost function that represents the characteristic of polarization mode dispersion and the number of taps that use tap coefficients other than 0.

Approximation of Characteristic of Polarization Mode Dispersion to Sparse Characteristic The characteristic of the transmission line is not a sparse characteristic. Nonetheless, the characteristic for the transmission line can be approximated to the sparse characteristic (sparse model) using the L0 norm-constrained CMA algorithm or the like.

L0 Norm-Constrained LMS Algorithm

The coefficient update unit 70 derives the point at which the value of the cost function is minimized by the steepest descent method using the L0 norm-constrained LMS algorithm. The cost function is expressed using a squared term (squared error) of the absolute value of an error between the signal output from the adaptive filter 72 and a target signal (target value), and a term proportional to the L0 norm. That is, the cost function "$\xi(n)$" is expressed as in Equation (2) using the error "$e(n)$" and the L0 norm "$\|w(n)\|_0$" of the tap coefficient vector "$w(n)$".

[Math. 2]

$$\xi(n) = |e(n)|^2 + \gamma \|w(n)\|_0 \tag{2}$$

Here, "$\gamma$" is a parameter for balancing the error "$e(n)$" with the L0 norm "$\|w(n)\|_0$". A variable "n" represents time step.

When an average value of L0 norm over a predetermined length of time exceeds an allowable range (maximum value "$L_{max}$"), the coefficient update unit 70 may increase the ratio of the L0 norm "$\|w(n)\|_0$" to the error "$\|e(n)\|^2$" between the signal output from the adaptive filter 72 and the predetermined target signal. When the average value of L0 norm over the predetermined length of time falls below an allowable range (minimum value "$L_{min}$"), the coefficient update unit 70 may reduce the ratio of the L0 norm to the error.

In performing the steepest descent method, the coefficient update unit 70 derives a local slope of the cost function "$\xi$" for the degree of freedom of the tap coefficient vector "w(n)" (for example, two-dimensional space where the tap length "N" is 2) around the tap coefficient vector "w(n)". The coefficient update unit 70 derives a new tap coefficient vector "w(n+1)" that is time shifted by a time step in a direction that reduces the cost function "$\xi$".

The coefficient update unit 70 derives the tap coefficient vector "w(n)" that minimizes the cost function "$\xi(n)$" by repeating the derivation of the new tap coefficient vector. The coefficient update unit 70 uses the tap coefficient vector "w(n)" to derive a new tap coefficient vector "w(n+1)" as in Equation (3).

[Math. 3]

$$w_i(n+1) = w_i(n) + \mu e(n)x(n-i) + \mu \gamma f_\beta(w_i(n)) \quad (3)$$

Here, "$w_i$" in the first term represents the i-th element of the tap coefficient vector. "$\mu e(n)x(n-i)$" in the second term is the term that minimizes the error "e(n)". "$\mu$" represents a step size for controlling the speed of convergence. The step size is a small positive real number. "x(n)" represents a signal input to the nth tap in the adaptive filter. The third term (the term that updates the tap coefficient vector) "$\mu \gamma f_\beta(w_i(n))$" is the term that minimizes the L0 norm (zero attractor). The zero attractor brings the value of Equation (3) close to 0 when the absolute value of the tap coefficient is small. "$f_\beta(w_i(n))$" is a derivative for the tap coefficient vector "w" of the component proportional to the L0 norm of the cost function "$\xi(n)$". The derivative for the tap coefficient vector "w" is represented as in Equation (4), as an example. "$\beta$" is a coefficient that determines a range of values of the zero attractor.

[Math. 4]

$$f_\beta(w_i) = -\beta \, \text{sgn}(w_i(n)) e^{-\beta|w_i(n)|} \quad (4)$$

The definition of the L0 norm "$\|w(n)\|_0$" is optional. For example, given that the L0 norm "$\|w(n)\|_0$" is defined as the number of taps for which the tap coefficient other than 0 is set, L0 norm "$\|w(n)\|_0$" is not differentiable with the tap coefficient vector "w". This is because whether the tap coefficient is 0 or not 0 is discontinuous. In the following, the L0 norm "$\|w(n)\|_0$" is approximated as in Equation (5):

[Math. 5]

$$\|w(n)\|_0 \approx \sum_{i=0}^{L-1} \left| 1 - e^{-\beta|w_i(n)|} \right| \quad (5)$$

When the value of "$\beta$" is infinite, Equation (5) is equal to Equation (4), but Equation (5) is not differentiable. Thus, "$\beta$" is defined as a real number of predetermined magnitude. In addition, since the amount of computation of the index computation is large, Equation (5) is approximated as in Equation (6).

[Math. 6]

$$e^{-\beta|w_i|} \approx \begin{cases} 1 - \beta|w_i|, & |w_i| \le \frac{1}{\beta} \\ 0, & \text{other} \end{cases} \quad (6)$$

Equation (4) is expressed as in Expression (7).

[Math. 7]

$$f_\beta(w_i) = \begin{cases} -\beta \, \text{sgn}(w_i(n))(1 - \beta|w_i|), & |w_i| \le \frac{1}{\beta} \\ 0, & \text{other} \end{cases} \quad (7)$$

Formula (7) is advantageous for implementation.

Figure 4:
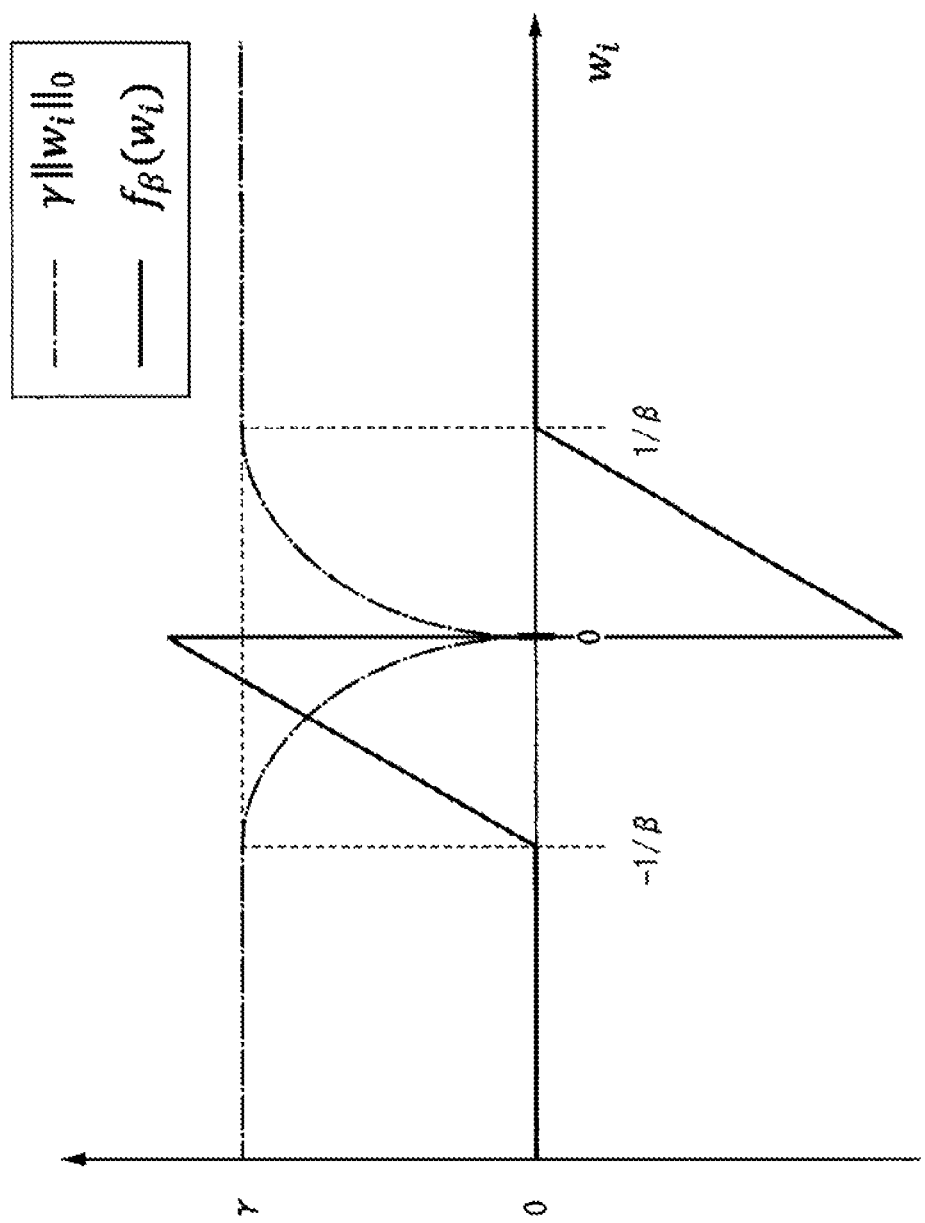
FIG. 4 is a diagram illustrating an example of an L0 norm term of a cost function and a derivative according to the embodiment.

FIG. 4 is a diagram illustrating an example of the L0 norm term of the cost function and the derivative "$f_\beta(w_i)$". In FIG. 4, the i-th element "$w_i$" of the tap coefficient vector is real number. The L0 norm term of the cost function may be understood as energy potential.

The derivative "$f_\beta(w_i)$" may be understood as the field of force.

L0 Norm-Constrained CMA Algorithm

The LMS algorithm is widely used as an algorithm for estimating a system. In the LMS algorithm, the error "e" needs to be derived for optimization. Generally, the error "e" is derived using a known signal or provisional determination. The error "e" is expressed as in Equation (8).

[Math. 8]

$$e = y - \hat{y} \quad (8)$$

Here, "y" represents a filter output signal. "$\hat{y}$" is a target signal (target value). The target signal is obtained as known information or as a result of provisional determination. In digital coherent optical transmission, the phase noise of laser light is large. Thus, in digital coherent optical transmission, for example, a phase insensitive CMA algorithm is used.

An equation for updating the tap coefficient vector in the CMA algorithm is the same as the equation for updating a tap coefficient vector in an LMS algorithm. A method of calculating the error in the CMA algorithm is different from the method of calculating the error in the LMS algorithm. The method of calculating the error in the CMA algorithm is expressed as in Equation (9).

[Math. 9]

$$e = |\hat{y}|^2 - |y|^2 \quad (9)$$

Here, "$|\hat{y}|^2$" represents power of the target signal. When power of the target signal is constant, for example, like Quadrature Phase Shift Keying (QPSK), "$|\hat{y}|^2$" may be 1. In the L0 norm-constrained CMA algorithm, the cost function is expressed as in Equation (10):

[Math. 10]

$$\xi(n) = |e(n)|^2 + \gamma\|w(n)\|_0 \quad (10)$$
$$= |\hat{y}|^2 - |y|^2 + \gamma\|w(n)\|_0$$

The Equation for updating the tap coefficient vector is expressed as in Equation (11):

[Math. 11]
$$w_i(n+1) = w_i(n) + \mu e(n) y^* x(n-i) + \mu \gamma f_\beta(w_i(n)) \quad (11)$$

Defining Value of Tap Coefficient to 0

By using the L0 norm-constrained algorithm, it is possible to make the characteristic of polarization mode dispersion sparse. However, the L0 norm-constrained algorithm brings the value of each element of the tap coefficient vector close to 0, but does not bring each element of the tap coefficient vector to be 0.

In terms of reducing the amount of computation, the value of each element (each tap coefficient) of the tap coefficient vector is preferably 0. Thus, when the absolute value of the element of the tap coefficient vector derived by the L0 norm-constrained algorithm is less than a threshold, the zeroing unit 71 changes the value of the tap coefficient whose absolute value is less than a threshold to 0.

The coefficient update unit 70 generates a first tap coefficient vector. The zeroing unit 71 generates a second tap coefficient vector based on the first tap coefficient vector. Note that instead of generating the second tap coefficient vector, the zeroing unit 71 may incorporate a processing of changing the value of the tap coefficient whose absolute value is less than the threshold in the first tap coefficient vector to 0, into a recursive optimization process in the L0 norm-constrained algorithm.

Next, an operation example of the signal processing apparatus 1 will be described.

Feedback Control to Obtain Desired L0 Norm

In the L0 norm-constrained algorithm, the L0 norm is optimized according to a cost function. As a result of the optimization, the coefficient update unit 70 cannot predict the number of taps that use tap coefficients other than 0. Even when the evaluation coefficient of the L0 norm is unchanged, the number of taps that use tap coefficients other than 0 vary depending on the state of the transmission line.

However, from the perspective of controlling power consumption by the coefficient update unit 70, it is preferable that the coefficient update unit 70 specifies the number (amount of computation) of taps that use tap coefficients other than 0. This may prevent power consumption of the signal processing apparatus from exceeding an allowable value of power consumption.

Thus, the coefficient update unit 70 derives the L0 norm of each adaptive filter 72 (FIR filter). The coefficient update unit 70 feeds back parameters such as "γ" to the cost function such that the L0 norm falls within a certain range.

Because the allowable value of power consumption is determined, for example, according to the heat dissipation capacity of the signal processing apparatus 1, even when the power consumption of the signal processing apparatus 1 exceeds the allowable value for a short period of time, there is no problem as long as the average value of the L0 norm for the predetermined length of time falls within the allowable range. Thus, the coefficient update unit 70 may feed back the parameters such as "γ" to the cost function based on the average value of the L0 norm for the predetermined length of time.

Figure 5:
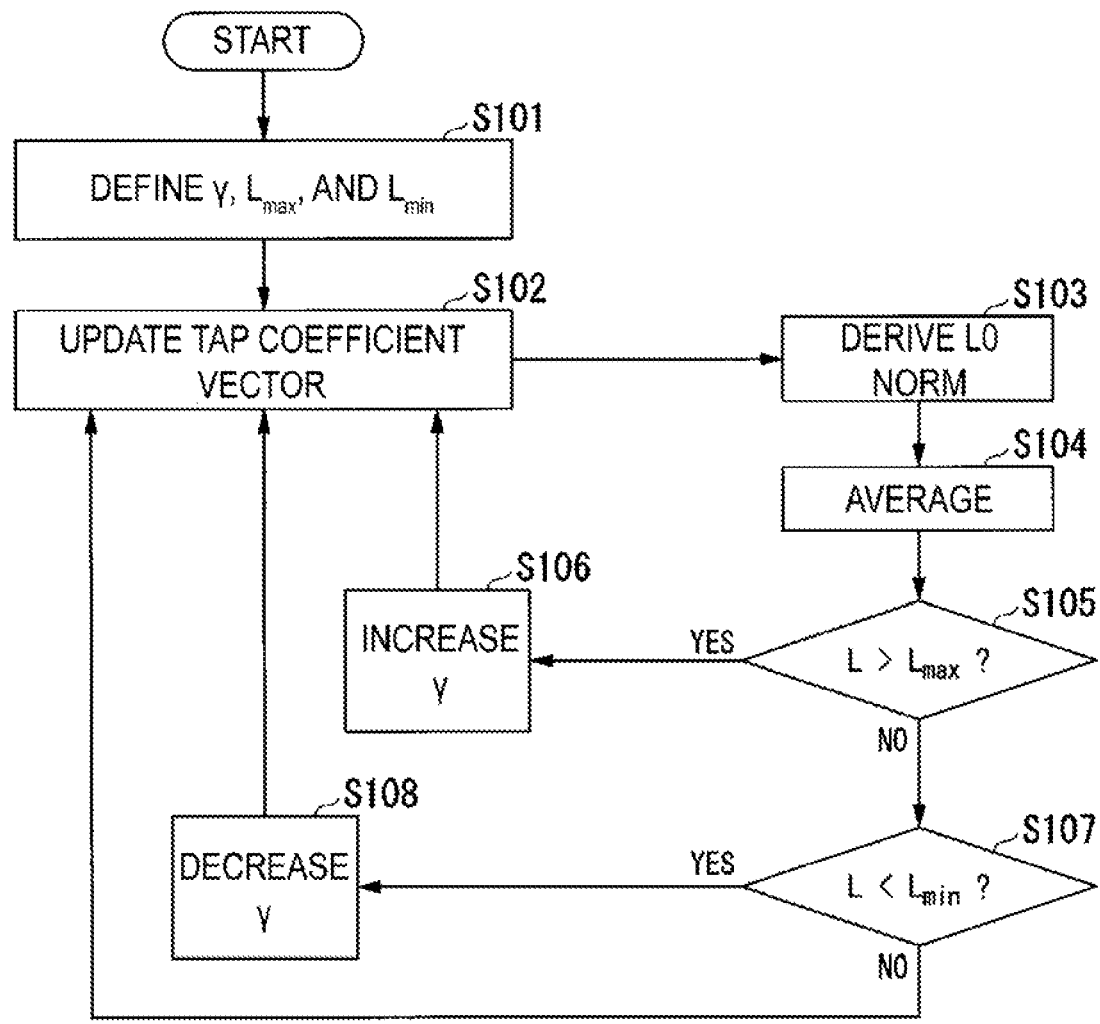
FIG. 5 is a flowchart illustrating an operation example of the signal processing apparatus according to the embodiment.

FIG. 5 is a flowchart illustrating an operation example of the signal processing apparatus 1. The coefficient update unit 70 defines the parameter "γ", the maximum value "$L_{max}$" of the length of the FIR filter, and the minimum value "$L_{min}$" of the length of the FIR filter length (Step S101). The coefficient update unit 70 updates the tap coefficient vector as in Equation (3) (Step S102). The coefficient update unit 70 derives the L0 norm of each adaptive filter 72 (FIR filter) (Step S103). The coefficient update unit 70 derives an average value "L" of the L0 norm for a predetermined length of time (Step S104).

The coefficient update unit 70 determines whether or not the average value "L" of the L0 norm for the predetermined length of time exceeds the maximum value "$L_{max}$" (Step S105). When the average value "L" of the L0 norm for the predetermined length of time exceeds the maximum value "$L_{max}$" (Step S105: YES), the coefficient update unit 70 increases the parameter "γ" (Step S106). The coefficient update unit 70 returns the processing back to Step S102.

When the average value "L" of the L0 norm for the predetermined length of time is the maximum value "$L_{max}$" or less (Step S105: NO), the coefficient update unit 70 determines whether the average value "L" of the L0 norm for the predetermined length of time is less than the minimum value "$L_{min}$" (Step S107). When the average value "L" of the L0 norm for the predetermined length of time is less than the minimum value "$L_{min}$" (Step S107: NO), the coefficient update unit 70 decreases the parameter "γ" (Step S108). The coefficient update unit 70 returns the processing back to Step S102.

When the average value "L" of the L0 norm for the predetermined length of time is the minimum value "$L_{min}$" or more (Step S107: NO), the coefficient update unit 70 returns the processing back to Step S102.

Next, an example of a simulation result will be described.

Figure 6:
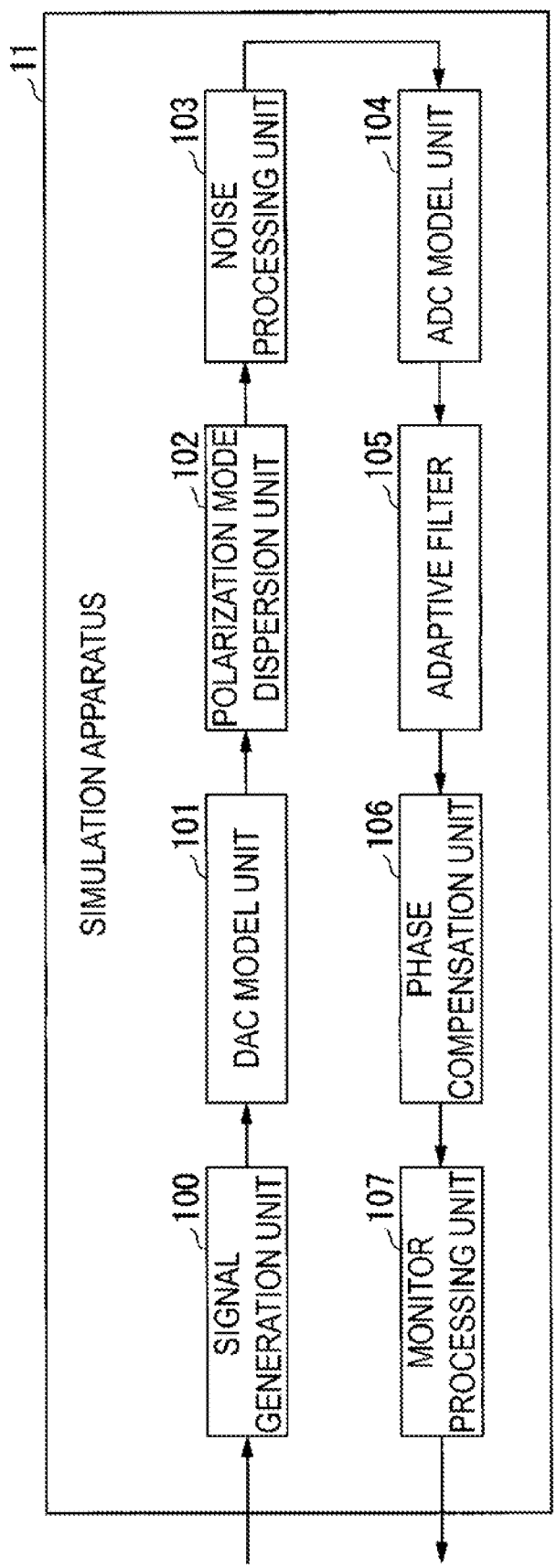
FIG. 6 is a diagram illustrating a configuration example of a simulation apparatus according to the embodiment.

FIG. 6 is a diagram illustrating a configuration example of a simulation apparatus 11. The simulation apparatus 11 includes a signal generation unit 100, a DAC model unit 101, a polarization mode dispersion unit 102, a noise processing unit 103, an ADC model unit 104, an adaptive filter 105, a phase compensation unit 106, and a monitor processing unit 107.

A part or all of the simulation apparatus 11 is realized as software by causing a processor such as DSP, CPU, or the like to execute a program expanded in a memory from a storage device, which is a nonvolatile recording medium (non-transitory recording medium). A part or all of the simulation apparatus 11 may be realized by hardware including an electronic circuit using LSI, ASIC, PLD, or FPGA, for example.

The signal generation unit 100 generates a dual-polarized QPSK signal according to an instruction. The baud rate of the dual-polarized QPSK signal is 59.8 GBd, as an example. The signal generation unit 100 outputs the dual-polarized QPSK signal to the DAC model unit 101.

The DAC model unit 101 generates waveform data for the dual-polarized QPSK signal based on a Digital Analog Converter (DAC) model. The bandwidth "$B_w$" of the signal in the DAC model unit 101 is 30 GHz, as an example. The effective number of bits (ENoB) representing DAC resolution is 5.5 as an example.

The polarization mode dispersion unit 102 performs polarization mode dispersion processing on waveform data of the dual-polarized QPSK signal. The noise processing unit 103 adds noise to the waveform data in which the polarization mode is dispersed. An optical signal to noise ratio is 29 dB as an example.

The ADC model unit 104 converts the waveform data into a digital signal (numerical signal) by performing quantization processing on the waveform data with added noise. The DAC bandwidth "$B_w$" is 30 GHz as an example. The bandwidth "$B_w$" of the signal in the ADC model unit 104 is 30 GHz as an example.

The configuration of the adaptive filter 105 is similar to the configuration of the adaptive filter 72 shown in FIG. 2. The number of taps included in the adaptive filter 105 is 31 as an example. The adaptive filter 105 performs adaptive equalization processing on a digital signals generated by the ADC model unit 104.

The phase compensation unit 106 applies phase compensation by a fourth power method to the digital signal subjected to the adaptive equalization processing. The monitor processing unit 107 displays constellation of the digital signal subjected to the phase compensation processing, on a predetermined display device. The monitor processing unit 107 may measure a bit error rate of the digital signal.

Figure 7:
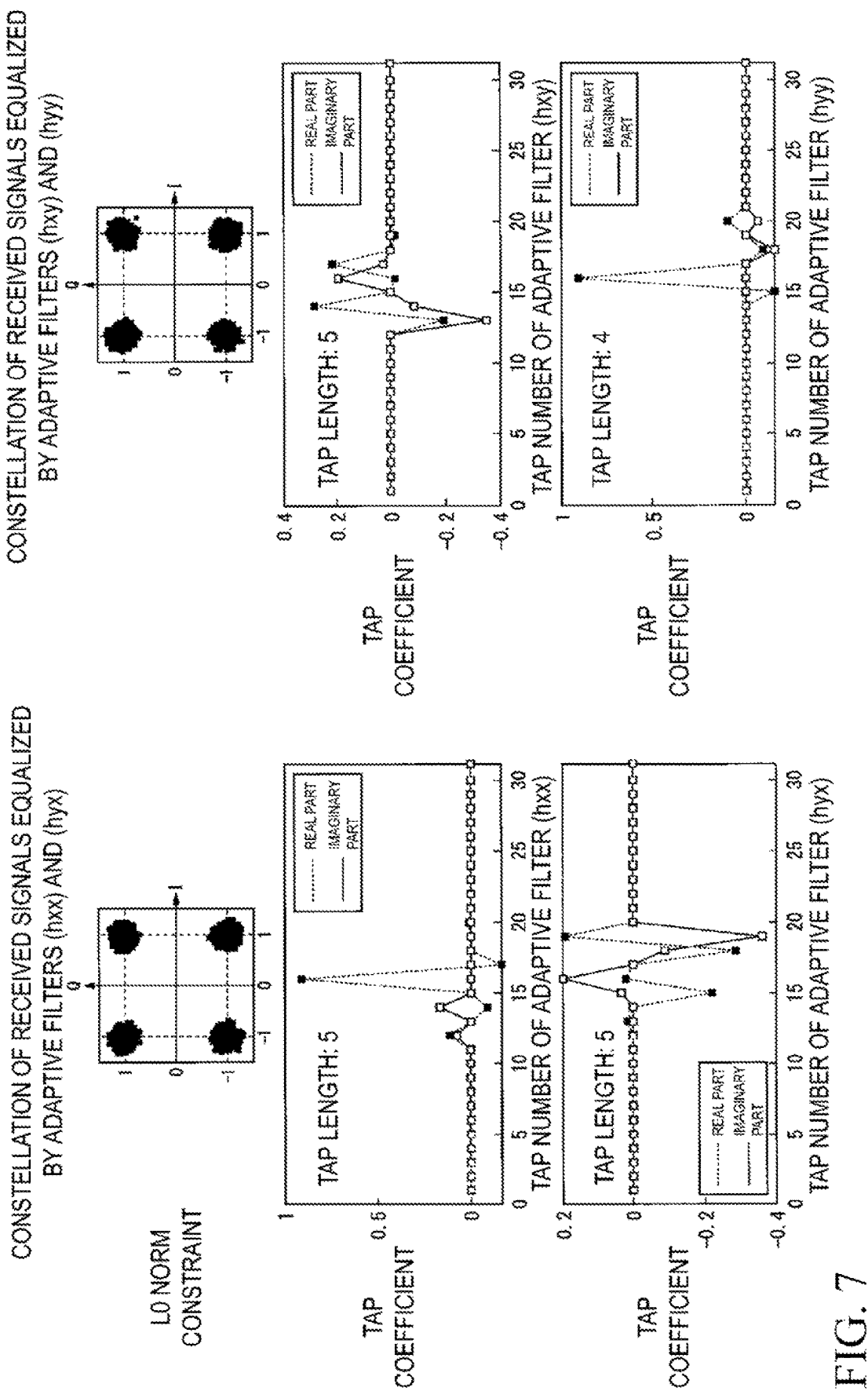
FIG. 7 is a diagram illustrating examples of simulation results in the case where the L0 norm is constrained, according to the embodiment.
Figure 8:
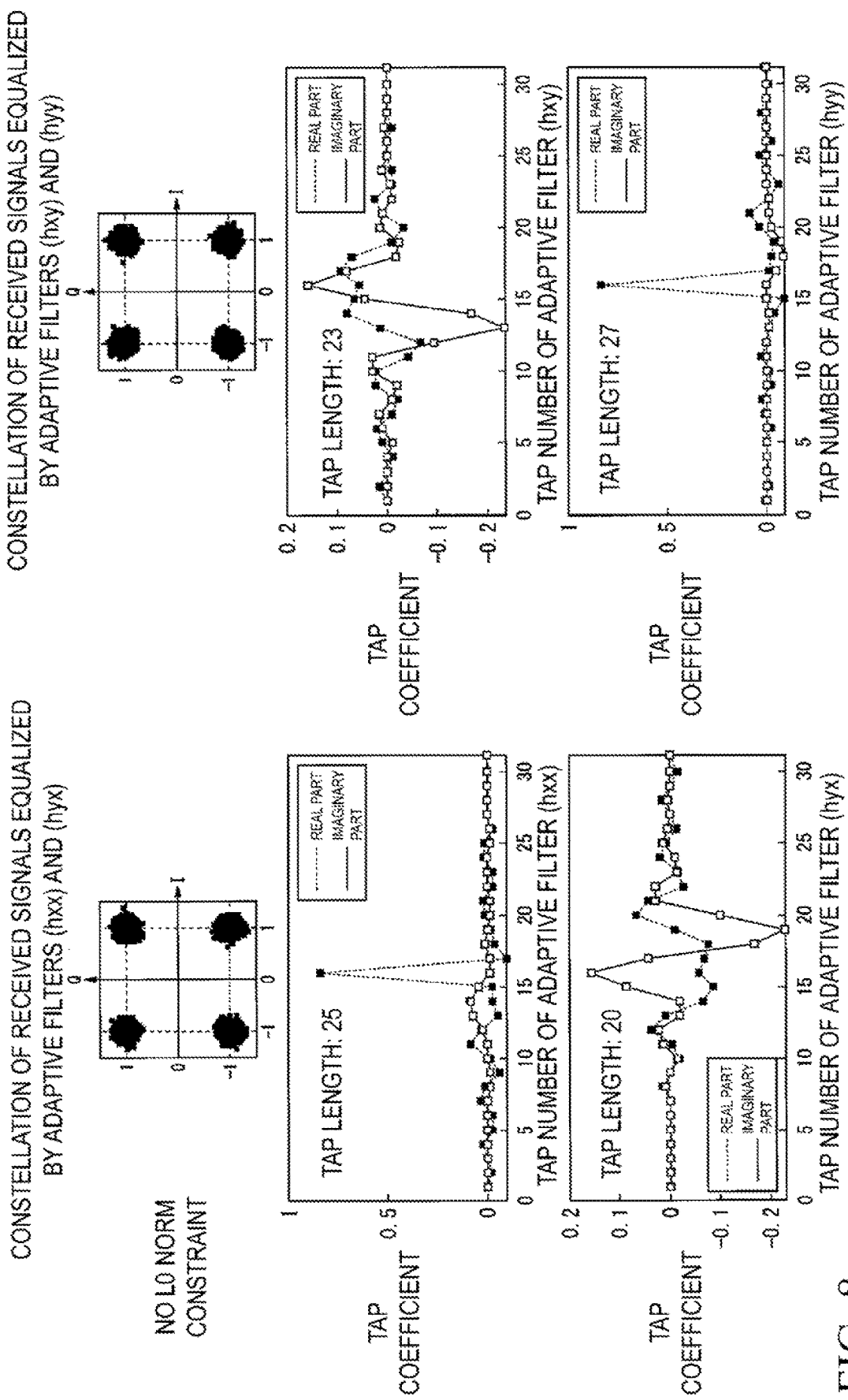
FIG. 8 is a diagram illustrating examples of simulation results in the case where the L0 norm is not constrained, according to the embodiment.

FIG. 7 is a diagram illustrating an example of simulation results (constellation of received optical signals, tap coefficients, etc.) in the case where the L0 norm is constrained. FIG. 8 is a diagram illustrating an example of simulation results (constellation of received optical signals, tap coefficients, etc.) when L0 norm is not constrained.

According to the L0 norm-constrained CMA algorithm in FIG. 7, as compared to the CMA algorithm illustrated in FIG. 8, tap coefficients of many taps exhibit values around 0.

The quality of the signals compensated by the CMA algorithm having no L0 norm constraint is good as illustrated in each constellation in FIG. 8. The quality of the signals compensated by the L0 norm-constrained CMA algorithm is also good as in FIG. 8, as illustrated in each constellation in FIG. 7. This indicates that the non-sparse polarization mode dispersion characteristic can be approximated by a sparse model according to the L0 norm-constrained CMA algorithm (sparsable).

As described above, the signal processing apparatus 1 according to the embodiment includes the adaptive equalizer 7. The adaptive equalizer 7 includes the coefficient update unit 70, the zeroing unit 71, and the adaptive filter 72. The coefficient update unit 70 approximates the characteristic of the transmission line of the optical signal by the first tap coefficient vector whose L0 norm is a predetermined value or less. The zeroing unit 71 replaces the tap coefficient whose absolute value is less than a threshold among the tap coefficients of the first tap coefficient vector with 0 to generate the second tap coefficient vector. The adaptive filter 72 performs the adaptive equalization processing on the digital signal corresponding to the optical signal received via the transmission line, based on the second tap coefficient vector.

This can maintain the performance of compensating for polarization mode dispersion generated in the optical signal, even when power consumption of the adaptive equalization processing is reduced.

Since the L0 norm constraint of the tap coefficient vector is imposed on an optimization algorithm (e.g., the CMA algorithm) for estimating the transmission characteristic of the optical signal, the coefficient update unit 70 creates a sparse tap coefficient vector. In other words, the coefficient update unit 70 creates the adaptive filter including the number of taps that use tap coefficients other than 0 is a threshold or less (adaptive filter whose tap length is a constraint or less). As a result, the coefficient update unit 70 can maintain the performance of compensating polarization mode dispersion. The coefficient update unit 70 can reduce power consumption while maintaining the performance of the DSP.

Although the embodiment of the present invention has been described in detail with reference to the drawings, a specific configuration is not limited to the embodiment, and a design or the like in a range that does not depart from the gist of the present invention is included.

INDUSTRIAL APPLICABILITY

The present invention is applicable to an adaptive equalizer of an optical transmission system.

REFERENCE SIGNS LIST

1 Signal processing apparatus
2 Transmission processing unit
3 Encoding unit
4 Mapping unit
5 Transmission waveform equalization unit
6 Wavelength dispersion compensation unit
7 Adaptive equalizer
8 Error correcting unit
9 Reception processing unit
10 Memory
11 Simulation apparatus
70 Coefficient update unit
71 Zeroing unit
72 Adaptive filter
73 Addition unit
100 Signal generation unit
101 DAC model unit
102 Polarization mode dispersion unit
103 Noise processing unit
104 ADC model unit
105 Adaptive filter
106 Phase compensation unit
107 Monitor processing unit
720 Delay unit
721 Multiplication unit
722 Addition unit

The invention claimed is:

1. A signal processing apparatus comprising:
a coefficient updater configured to approximate a characteristic of a transmission line of an optical signal by a first tap coefficient vector of which an L0 norm is a predetermined value or less,
wherein when an average value of the L0 norm exceeds an allowable range, the coefficient updater increases a ratio of the L0 norm to an error between a signal output from the adaptive filter and a predetermined target signal, and when the average value of the L0 norm falls below the allowable range, the coefficient updater decreases a ratio of the L0 norm to the error;
a generator configured to generate a second tap coefficient vector by replacing, with 0, a tap coefficient of which an absolute value is less than a threshold, among tap coefficients of the first tap coefficient vector; and
an adaptive filter configured to perform adaptive equalization processing, based on the second tap coefficient vector, on a digital signal corresponding to an optical signal received via the transmission line,
wherein each of the coefficient updater, and the generator is implemented by:
i) computer executable instructions executed by at least one processor,
ii) at least one circuitry or
iii) a combination of computer executable instructions executed by the at least one processor and the at least one circuitry.

2. The signal processing apparatus according to claim 1, wherein the coefficient updater approximates the characteristic of the transmission line by the first tap coefficient vector using an algorithm of a steepest descent method having a constraint that the L0 norm is a predetermined value or less.

3. A signal processing method performed by a signal processing apparatus, the method comprising:
   approximating a characteristic of a transmission line of an optical signal by a first tap coefficient vector of which an L0 norm is a predetermined value or less,
   wherein when an average value of the L0 norm exceeds an allowable range, a coefficient updater increases a ratio of the L0 norm to an error between a signal output from the adaptive filter and a predetermined target signal, and when the average value of the L0 norm falls below the allowable range, the coefficient updater decreases a ratio of the L0 norm to the error;
   generating a second tap coefficient vector by replacing, with 0, a tap coefficient of which an absolute value is less than a threshold, among tap coefficients of the first tap coefficient vector; and
   performing adaptive equalization processing, based on the second tap coefficient vector, on a digital signal corresponding to an optical signal received via the transmission line.

4. A non-transitory computer readable medium storing a program for causing a computer to operate as the signal processing apparatus described in claim 1.

* * * * *